(12) United States Patent
Fujimori et al.

(10) Patent No.: US 7,198,830 B2
(45) Date of Patent: Apr. 3, 2007

(54) POLYCARBONATE RESIN COMPOSITION AND POLARIZING SHEET USED THE SAME

(75) Inventors: Takayasu Fujimori, Tsukuba (JP); Noriyuki Kato, Tsukuba (JP); Shingo Kanasaki, Tsukuba (JP); Ryozo Kawai, Tokorozawa (JP); Hiromi Kagaya, Tokorozawa (JP)

(73) Assignees: Mitsubishi Gas Chemical Company Inc., Tokyo (JP); Fuji Kasei Co., Ltd., Saitama (JP)

( * ) Notice: Subject to any disclaimer, the term of this patent is extended or adjusted under 35 U.S.C. 154(b) by 365 days.

(21) Appl. No.: 10/833,314

(22) Filed: Apr. 28, 2004

(65) Prior Publication Data

US 2004/0245511 A1    Dec. 9, 2004

(30) Foreign Application Priority Data

Jun. 6, 2003    (JP) .............................. 2003-162638

(51) Int. Cl.
*G02B 5/30* (2006.01)
*F21V 9/14* (2006.01)
*C08G 63/16* (2006.01)
*C08G 64/24* (2006.01)
*C08G 64/30* (2006.01)

(52) U.S. Cl. ...................... 428/1.31; 428/412; 252/582; 524/306; 524/315; 528/176; 528/193; 528/194; 528/195; 528/196; 528/204

(58) Field of Classification Search ................ 428/1.1, 428/1.31, 412; 528/196, 198, 176, 193, 194, 528/195, 204; 252/582; 524/306, 315
See application file for complete search history.

(56) References Cited

U.S. PATENT DOCUMENTS 6,355,768 B1 *    3/2002    Fujimori et al. ............ 528/196

FOREIGN PATENT DOCUMENTS

| EP | 1 153 955 A1 | 11/2001 |
|---|---|---|
| JP | 9-5683 | 1/1997 |
| JP | 10-101786 | 4/1998 |
| JP | 10-101787 | 4/1998 |
| JP | 2000-169573 | 6/2000 |
| JP | 2001-305341 | 10/2001 |

OTHER PUBLICATIONS

English translation http://www4.ipdl.ncipi.go.jp/Tokujitu/PAJdetail.ipdl?N0000=60&N0120=01&N2001=2&N3001=2000-169573by computer for JP 2000-169573.*
Derwent Abstract of JP No. 09 005683, Jan. 10, 1997, Tsutsunaka Plastic Ind. Co., Ltd.
Derwent Abstract of JP No. 2004 067990, Mar. 4, 2004, Mitsubishi Gas Chemical Co., Inc.

* cited by examiner

*Primary Examiner*—Shean C. Wu
(74) *Attorney, Agent, or Firm*—Sughrue Mion, PLLC

(57) ABSTRACT

A polycarbonate resin composition obtained by blending a polycarbonate resin (A) obtained by forming a carbonate bond from 95 to 5 mol % of a dihydroxy compound having a fluorene structure represented by the general formula (1) and 5 to 95 mol % of a dihydroxy compound having a dimethanol structure represented by the general formula (2) and a carbonic diester and a polycarbonate resin (B) obtained by forming a carbonate bond from bisphenol A and a carbonic acid diester or phosgene in a ratio of $(100 \times (A)/((A)+(B))) = 1$ to 99% by weight and a polarizing sheet used the same.

11 Claims, No Drawings

POLYCARBONATE RESIN COMPOSITION AND POLARIZING SHEET USED THE SAME

BACKGROUND OF THE INVENTION

1) Field of the Invention

The present invention relates to a polycarbonate resin composition excellent in chemical resistance and oil resistance, having low birefringence obtained by blending a polycarbonate resin derived from specific dihydroxy compounds and a polycarbonate resin from 2,2-bis(4-hydroxyphenyl) propane and to a polarizing sheet adhered a transparent sheet comprising the polycarbonate resin composition to a polarizing film.

2) Prior Art

A polycarbonate resin derived from 2,2-bis(4-hydroxyphenyl)propane (so-called bisphenol A) has been widely applied to optical materials including a base material of CD or DVD, optical films, optical sheets, various lenses and prisms since it is excellent in transparency, heat resistance, low water absorbing ability, chemical resistance, dynamic properties and dimensional stability. However, the polycarbonate resin derived from bisphenol A has a defect that it cannot be applied to the field to require low birefringence because it has a large photoelastic constant.

Thus, in the field to require low birefringence, an acrylic resin, an amorphous polyolefin or a polycarbonate resin with a particular structure have been used. However, for example, an acrylic resin has a defect that water absorbing degree is high and dimensional stability is poor. An amorphous polyolefin has defects that both impact resistance and chemical resistance are poor and it is expensive. Since each molded articles of an acrylic resin and an amorphous polyolefin have not always satisfactory low birefringence, these resins cannot be applied to the field to require further low birefringence.

As a polycarbonate resin with a particular structure, for example, Japanese Patent Kokai (Laid-open) No. 2000-169573 discloses a copolymerization polycarbonate resin derived from 9,9-bis(3-methyl-4-hydroxyphenyl)fluorene and tricyclo[5.2.1.0$^{2,6}$]decanedimethanol. Although an injection molded article comprising this resin exhibits sufficiently low birefringence, it has a defect that it is readily colored during production.

Further, as a polycarbonate resin with a particular structure, Japanese Patent Kokai (Laid-open) No. 10-101787 discloses a polycarbonate resin derived from 9,9-bis(4-(2-hydroxyethoxy)phenyl)fluorene. Although the polycarbonate resin has lower birefringence than that of a polycarbonate resin derived from bisphenol A, flowability, chemical resistance and oil resistance are insufficient and furthermore it is very expensive. Japanese Patent Kokai (Laid-open) No. 10-101786 discloses a polycarbonate resin derived from 9,9-bis(4-(2-hydroxyethoxy)phenyl)fluorene and bisphenols. Although the polycarbonate resin has lower birefringence than that of a polycarbonate resin derived from bisphenol A, flowability, chemical resistance and oil resistance are insufficient and photoelastic constant is not sufficiently low.

Thus, Japanese Patent Application No. 2003-039586 suggests a copolymerization polycarbonate resin derived from 9,9-bis(4-(2-hydroxyethoxy)phenyl)fluorene and aliphatic diols. Although the resin exhibits sufficiently low birefringence, excellent flowability and low photoelastic constant, chemical resistance and oil resistance are not sufficient.

Therefore, a low price polycarbonate resin excellent in chemical resistance and oil resistance having low birefringence has been required.

On the other hand, a polarizing sheet has been widely applied to the field of optical materials such as a sun glass and a goggle to require anti-glare since it exhibits excellent anti-glare. The polarizing sheet has a structure adhered a transparent sheet to one side or both sides of a polarizer. As the polarizer, for example, there is used a polarizing film in which iodine or a dichroic dye is adsorbed to a polymer film including, typically, polyvinylalcohol or derivatives thereof and the film to be thus obtained is stretch-oriented to uniaxis. As the transparent sheet, cellulose sheets, acrylic sheets and polycarbonate sheets have been used, among which polycarbonate sheets have been widely used in the field to require impact resistance and heat resistance.

Polycarbonate herein means a conventional, low price and readily obtainable polycarbonate resin derived from bisphenol A. However, the polycarbonate resin derived from bisphenol A, as described above, has a defect that birefringence and photoelastic constant are large.

According to studies by the inventors of the present invention, they have found that when a transparent film comprising a polycarbonate resin derived from bisphenol A is adhered to both sides of a polarizing film to form a polarizing sheet and the polarizing sheet thus obtained is vacuum formed, pressure formed or press formed into a curved surface shape, optical strain is caused in a portion of the curved surface due to stress strain, so that remarkable bad influence to disturb polarization occurs.

When a curved surface-shaped molded article with such optical strain is seen from its oblique side, color ununiformity of rainbow color is observed. Further, when the curved surface polarizing sheet is observed in the state overlapped to a flat polarizing sheet disposed so as for each polarizing axes to form orthogonal position to each other, so-called "discoloration" in which a light is transmitted and colored interference fringe are observed. Further, when the curved surface polarizing sheet is observed in the state overlapped to a flat polarizing sheet disposed so as for each polarizing axes to become parallel to each other, coloration different from a color of the polarizing film is observed in a portion of the polarizing sheet and colored interference fringe is observed.

For example, Japanese Patent Kokai (Laid-open) No. 9-5683 discloses a convex lens shaped polarizing sheet for spectacle in which a polycarbonate resin sheet with a retardation value [defined as birefringence ($\Delta$ n)×thickness (d)] of 3000 to 6000 nm is laminated on at least one side of a polarizing film and curve surface-processing is performed. The publication describes that a polycarbonate resin sheet with a retardation value of at least 3000 nm derived from bisphenol A is adhered to both sides of a polarizing film to make a polarizing sheet and the polarizing sheet is cut into a round shape and then curve surface-processed into a convex lens shape by pressure forming and when the a convex lens shaped polarizing sheet is observed from its oblique direction, no color ununiformity is observed. This process has been applied to actual production and is an available process. However, the process causes problems in workability that orientation treatment by stretching is required in order to secure a retardation value of a polycarbonate resin sheet and furthermore it is necessary to accord the orientation axis to the axis direction of the polarizing sheet. Further, the polycarbonate resin sheet has a defect that shrinkage occurs with heating in secondary processing.

Japanese Patent Kokai (Laid-open) No. 2001-305341 discloses a polarizing sheet adhered a polycarbonate sheet with a retardation value of 300 nm or below and a thickness of 0.05 to 0.25 mm to one side or both sides of a polarizing film. In the publication, a transparent protective sheet composed of a polycarbonate resin derived from bisphenol A is prepared according to a cast method and then the transparent protective sheet is adhered to both sides of a polarizing film to prepare a polarizing sheet and polarizing performances of the polarizing sheet has been evaluated. However, in the publication, polarizing performances in case of not performing curve surface-processing for a polarizing sheet with a transparent protective sheet composed of a polycarbonate resin derived a bisphenol A have been merely evaluated. As a result of studies by the inventors of the present invention, the polarizing sheet was cut into a round shape and then curve surface-processed into a convex lens by vacuum forming to prepare a convex lens shaped polarizing sheet and when the convex lens shape polarizing sheet was seen from its oblique side, color ununiformity of rainbow color was observed. Further, when this curved surface polarizing sheet was observed in the state overlapped to a flat polarizing sheet disposed so as for each polarizing axes to form orthogonal position to each other, so-called "discoloration" in which a light is transmitted and colored interference fringe were observed. Further, when the curved surface polarizing sheet was observed in the state overlapped to a flat polarizing sheet disposed so as for each polarizing axes to become parallel to each other, coloration different from a color of the polarizing film was observed in a portion of the polarizing sheet and colored interference fringe was observed. This means that even when curve surface-processing is performed, optical properties of the product are still insufficient.

After the completion of curve surface-processing, optical strain is caused. In other words, when the curved surface polarizing sheet is seen from its oblique side, color ununiformity of rainbow color is observed; when the curved surface polarizing sheet is observed in the state overlapped to a flat polarizing sheet disposed so as for each polarizing axes to form orthogonal position to each other, so-called "discoloration" in which a light is transmitted and colored interference fringe are observed or when the curved surface polarizing sheet is observed in the state overlapped to a flat polarizing sheet disposed so as for each polarizing axes to become parallel to each other, coloration different from a color of the polarizing film is observed in a portion of the polarizing sheet and colored interference fringe is observed. This is due to large birefringence of the polycarbonate resin derived from bisphenol A, i.e., large intrinsic birefringence, large orientation distribution function or large photoelastic constant.

Therefore, as a transparent protective sheet of a polarizing film, various resins with low birefringence have been tested. However, as a result of studies, the inventors have found that a transparent protective sheet composed of an amorphous polyolefin as typical low birefringence resin is processed into a polarizing sheet and when the polarizing sheet thus obtained is curve surface-processed into a convex lens shape, optical strain which is not observed in a flat polarizing sheet is caused, i.e., when the curved surface polarizing sheet is seen from its oblique side, color ununiformity of rainbow color is observed; when the curved surface polarizing sheet is observed in the state overlapped to a flat polarizing sheet disposed so as for each polarizing axes to form orthogonal position to each other, so-called "discoloration" in which a light is transmitted and colored interference fringe are observed or when the curved surface polarizing sheet is observed in the state overlapped to a flat polarizing plate disposed so as for each polarizing axes to become parallel to each other, coloration different from a color of the polarizing film is observed in a portion of the polarizing sheet and colored interference fringe is observed.

Thus, a polarizing sheet in which optical strain is not substantially caused in curve surface-processing and optical properties including appearance are very excellent has been required. Such polarizing plate can be suitably applied to various optical uses including anti-glare materials.

SUMMARY OF THE INVENTION

The present invention is to solve the above-mentioned problems of prior art and to provide a transparent, low price polycarbonate resin composition excellent in chemical resistance and oil resistance having low birefringence and furthermore to provide a polarizing sheet which does not substantially cause optical strain in curve surface-processing.

As a result of studies to solve the above-mentioned prior art problems, the inventors have found that the above-mentioned problems can be solved by providing a polycarbonate resin composition obtained by blending a polycarbonate resin (A) obtained by forming a carbonate bond from 95 to 5 mol % of a dihydroxy compound represented by the following general formula (1) and 5 to 95 mol % of a dihydroxy compound represented by the following general formula (2) and a carbonic acid diester and a polycarbonate resin (B) obtained by forming a carbonate bond from a dihydroxy compound represented by the following structural formula (3) and a carbonic acid diester or phosgene in a ratio of $(100 \times (A)/((A)+(B)))=1$ to 99% by weight;

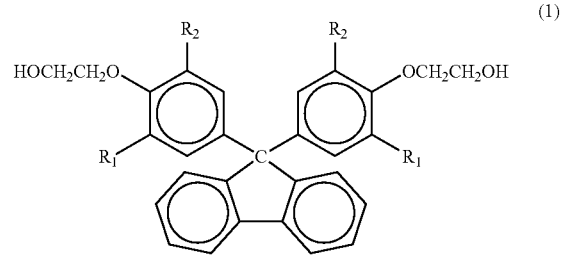
(1)

wherein $R_1$ and $R_2$ are, each independently, a hydrogen atom or a methyl group;

(2)

wherein Y is an alkylene group having 1 to 10 carbon atoms or a cycloalkylene group having 4 to 20 carbon atoms;

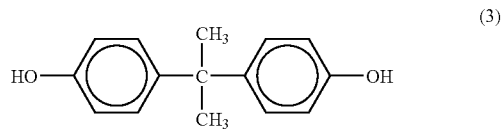
(3)

and furthermore a polarizing sheet adhered a transparent sheet comprising said polycarbonate resin composition to a polarizing film, and have accomplished the present invention.

DETAILED DESCRIPTION OF THE INVENTION

The present invention will be described in more detail below.

The polycarbonate resin (A) as one component in the blend of the present invention can be obtained by polymerizing a dihydroxy compound represented by the general formula (1) and a dihydroxy compound represented by the general formula (2) in the presence of a carbonic acid diester and a catalyst according to a known melt polycondensation process. Further, the polycarbonate resin (B) as another component in the blend of the present invention can be obtained by polymerizing a dihydroxy compound represented by the structural formula (3) according to a known melt polycondensation process or a phosgene process (an interfacial process).

Examples of the dihydroxy compound represented by the general formula (1) include 9,9-bis(4-(2-hydroxyethoxy)phenyl)fluorene, 9,9-bis(4-(2-hydroxyethoxy)-3-methylphenyl)fluorene and, 9,9-bis(4-(2-hydroxyethoxy)-3,5-dimethylphenyl)fluorene, among which 9,9-bis(4-(2-hydroxyethoxy)phenyl)fluorene is preferable.

Examples of the dihydroxy compound represented by the general formula (2) include tricyclo[$5.2.1.0^{2,6}$]decanedimethanol, cyclohexane-1,4-dimethanol, cyclopentane-1,3-dimethanol, norbornane-dimethanol, pentacyclopentadecanedimethanol and decaline-2,6-dimethanol, among which tricyclo[$5.2.1.0^{2,6}$]decanedimethanol, cyclohexane-1,4-dimethanol and pentacyclopentadecanedimethanol are preferable and tricyclo[$5.2.1.0^{2,6}$]decanedimethanol is more preferable.

The dihydroxy compound represented by the structural formula (3) is 2,2-bis(4-hydroxyphenyl)propane (so-called bisphenol A). As the polycarbonate resin (B) to be used in the present invention, a homopolymer derived from bisphenol A is suitably used. Dihydroxy compound other than bisphenol A may be copolymerized in a small amount in the range not to impair properties and transparency of the polydarbonate resin composition of the present invention. Examples of such other dihydroxy compound include 2,2-bis(4-hydroxy-3-methylphenyl)propane, 2,2-bis(4-hydroxy-3,5-dimethylphenyl)propane, 1,1-bis(4-hydroxyphenyl)ethane, bis(4-hydroxyphenyl)methane, 1,1-bis(4-hydroxyphenyl)cyclohexane, 1,1-bis(4-hydroxyphenyl)-1-phenylethane, 9,9-bis(4-hydroxy-3-methylphenyl)fluorene, 4,4'-dihydroxyphenylether, 4,4'-dihydroxyphenyl-sulfone, tricyclo[$5.2.1.0^{2,6}$]decanedimethanol, cyclohexane-1,4-dimethanol and pentacyclopentadecanedimethanol.

The polycarbonate resin (A) as one component in the blend of the present invention is derived from 95 to 5 mol % of a dihydroxy compound represented by the general formula (1) and 5 to 95% mol of a dihydroxy compound represented by the general formula (2), preferably 90 to 20 mol % of a dihydroxy compound represented by the general formula (1) and 10 to 80 mol % a dihydroxy compound represented by the general formula (2) and more preferably 75 to 35 mol % of a dihydroxy compound represented by the general formula (1) and 25 to 65 mol % of a dihydroxy compound represented by the general formula (2). When the dihydroxy compound represented by the general formula (1) is less than 5 mol %, it is not preferable since birefringence of the blend resin composition becomes large. When the dihydroxy compound represented by the general formula (1) is more than 95% mol, it is not preferable since transparency of the blend resin composition deteriorates.

The blending weight percentage of polycarbonate resins (A) and (B) is $(100\times(A))/((A)+(B))=1$ to 99% by weight, preferably 10 to 90% by weight and more preferably 10 to 70% by weight. When the blending percentage is less than 1% by weight, it is not preferable since the blend resin composition does not exhibit satisfactorily low birefringence. When the blending percentage is more than 99% by weight, it is not preferable since chemical resistance and oil resistance of the blend resin composition become insufficient.

The polystyrene-converted weight average molecular weight (Mw) of the polycarbonate resin (A) is preferably 20,000 to 300,000 and more preferably 35,000 to 150,000. When the Mw is less than 20,000, it is not preferable since the blend resin composition becomes brittle. When the Mw is more than 300,000, it is not preferable since its melt viscosity becomes high and blending conditions become severe; the molding conditions of the blend resin composition become severe, so that a molded article is colored or comes to foam and silver streak is caused in the molded article and its solubility for a solvent becomes low, so that blending according to a cast method or molding for formation of a film becomes difficult.

The polystyrene-converted weight average molecular weight (Mw) of the polycarbonate resin (B) is preferably 15,000 to 250,000 and more preferably 20,000 to 110,000. When the Mw is less than 15,000, it is not preferable since the blend resin composition becomes brittle. When the Mw is more than 250,000, it is not preferable since its melt viscosity becomes high and blending conditions become severe; the molding conditions of the blend resin composition become severe, so that a molded article is colored or comes to foam and silver streak is caused in the molded article and its solubility for a solvent becomes low, so that blending according to a solvent method or molding for formation of a film becomes difficult.

The difference of polystyrene-converted weight average molecular weight ($\Delta$ Mw) between the polycarbonate resins (A) and (B) is preferably 0 to 120,000 and more preferably 0 to 80,000. When the $\Delta$ Mw is more than 120,000, it is not preferable since the difference of viscosity between (A) and (B) becomes remarkably large, so that compatibility degrades and transparency of the blend resin composition deteriorates.

The polycarbonate resin (A) to be used in the blend resin composition contains random-, block- and alternating copolymerization structure.

The glass transition temperature (Tg) of the blend resin composition of the present invention is preferably 90 to 180° C. and more preferably 100 to 170° C. When Tg is lower than 90° C., it is not preferable since the temperature range for use becomes narrow, When it is more than 180° C., it is not preferable since molding conditions become severe.

The process for producing the polycarbonate resin (A) of the present invention is described below. A known melt polycondensation process comprising reacting a dihydroxy compound and a carbonic acid diester in the presence of a basic compound catalyst, a transesterfication catalyst or a mixed catalyst containing both thereof is suitably applied.

Examples of carbonic acid diester include diphenyl carbonate, ditolyl carbonate, bis(chlorophenyl)carbonate, di-m-cresyl carbonate, dimethyl carbonate, diethyl carbonate, dibutyl carbonate and dicyclohexyl carbonate, among which diphenyl carbonate is preferable. Carbonic acid diester is used in a molar ratio of preferably 0.98 to 1.20 and more preferably 0.99 to 1.10 per total 1 mol of dihydroxy compounds.

Examples of basic compound catalyst include alkaline metal compounds and/or alkaline earth metal compounds and nitrogen-containing compounds.

As the basic compound, organic acid salts, inorganic acid salts, oxides, hydroxides, hydrides or alkoxides of alkali metal and/or alkaline earth metal, quaternary ammonium hydroxides and salts thereof and amines are preferably used. One kind of above-mentioned compound or a mixture of above-mentioned compounds can be used.

Examples of the alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium hydroborate, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, each disodium salt, dipotassium salt, dicesium salt and dilithium salt of bisphenol A and each sodium salt, potassium salt, cesium salt and lithium salt of phenol.

Examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of the nitrogen-containing compound include quaternary ammonium hydroxides having alkyl group or aryl group including tetra-methylammonium hydroxide, tetraethylammonium hydroxide, tetrapropylammonium hydroxide, tetra-butylammonium hydroxide and trimethyl benzyl-ammonium hydroxide, tertiary amines including triethyl amine, dimethylbenzilamine and triphenylamine, secondary amines including diethylamine and dibutylamine, primary amines including propylamine and butylamine, imidazoles including 2-methylimidazole, 2-phenylimidazole and benzoimidazole and bases or basic salts including ammonia, tetramethylammonium borohydride, tetrabutylammonium borohydride, tetrabutylammonium tetraphenylborate and tetraphenylammonium tetraphenylborate.

As a transesterification catalyst, each salt of zinc, tin, zirconium and lead is preferably used. They can be used each alone or in the combination thereof.

Examples of the transesterfication catalyst include zinc acetate, zinc benzoate, zinc 2-ethyl hexanoats, tin(II)chloride, tin(IV)chloride, tin(II)acetate, tin(IV)acetate, dibutyltin dilaurate, dibutyltin oxide, dibutyltin dimethoxide, zirconium acetylacetonate, zirconium oxyacetate, zirconium tetrabutoxide, lead(II)acetate and lead(IV)acetate.

The catalyst is used in a molar ratio of $10^{-9}$ to $10^{-3}$ mol and preferably $10^{-7}$ to $10^{-4}$ mol per total 1 mol of the dihydroxy compounds.

The melt polycondensation of the present invention is performed by transesterification with heating under atmospheric pressure or a reduced pressure using above-mentioned raw materials and catalyst while removing by-products. The reaction is usually performed in multiple stages of two stages or above.

In detail, the first stage reaction is performed at a temperature of 120 to 260° C. and preferably 180 to 240° C. for 0.1 to 5 hours and preferably 0.5 to 3 hours. Then, the reaction of the dihydroxy compounds and carbonic acid diester is performed while increasing the degree of reduced pressure in the reaction system and raising the reaction temperature and finally polycondensation is performed under a reduced pressure of 1 mmHg or below at a temperature of 200 to 350° C. for 0.03 to 10 hours. Such reaction may be performed in a continuous process or in a batch wise. The reaction apparatus to be used in above-mentioned reaction may be a vertical type reaction apparatus equipped with anchor type stirring blade, maxblend stirring blade, or helicalribbon type stirring blade, etc., a horizontal type reaction apparatus equipped with paddle blade, lattice blade, spectacle shaped blade or an extruder type reaction apparatus equipped with a screw and it is suitable to use a combination of above-mentioned reaction apparatuses considering a viscosity of the polymer.

In the process of producing the polycarbonate resin after the completion of the polymerization reaction, the catalyst is removed or deactivated in order to maintain heat stability and hydrolysis stability of the polycarbonate resin thus obtained. Usually, a method for deactivating a catalyst by addition of known acid substance is suitably applied.

Preferable examples of the acid substance include esters including butyl benzoate and dodencyl benzoate, aromatic sulfonic acids including p-toluene sulfonic acid and dodecylbenzene sulfonic acid, aromatic sulfonic acid esters including butyl p-toluene-sulfonate, hexyl p-toluenesulfonate, octyl p-toluenesulfonate, phenyl p-toluenesulfonate and phenethyl p-toluenesulfonate, phosphoric acids including phosphorous acid, phosphoric acid and phosphonic acid, phosphites including triphenyl phosphite, monophenyl phosphite, diphenyl phosphite, monoethyl phosphite, diethyl phosphite, di-n-propyl phosphite, di-n-butyl phosphite, mono-n-butyl phosphite, di-n-hexyl phosphite, dioctyl phosphite and monooctyl phosphite, phosphates including triphenyl phosphate, diphenyl phosphate, monophenyl phosphate, monoethyl phosphate, diethyl phosphate, monobutyl phosphate, dibutyl phosphate, dioctyl phosphate and monoctyl phosphate, phosphonic acids including diphenyl phosphonic acid, dioctyl phosphonic acid and dibutyl phosphonic acid, phosphonates including diethyl phenyl phosphonate, phosphines including triphenyl phosphine and bis(diphenyl-phosphino)ethane, boric acids including boric acid and phenyl boric acid, aromatic sulfonic acid salts including dodecylbenzene sulfonic acid tetrabutyl phosphonium salt, organic halides including benzoyl chloride and p-toluene-sulfonyl chloride, alkyl sulfates including dimethyl sulfate and organic halides including benzyl chloride. They are suitably used.

After the deactivation of the catalyst, a step to remove low boiling point compounds in the polymer with vaporization under a pressure of 0.1 to 1 mmHg at a temperature of 200 to 350° C. may be added. For its purpose, a horizontal apparatus equipped with a stirring blade with excellent surface renewing capacity such as paddle blade, lattice blade, spectacle shaped blade, etc. or thin film vaporizer is suitably used.

As one process for producing the polycarbonate resin (B) of the present invention, a known melt polycondensation process comprising reacting a dihydroxy compound and a carbonic acid diester in the presence of a basic compound catalyst is suitably applied. The process is the same as the process for producing the polycarbonate resin (A) except that no transition metal type transesterfication catalyst is used.

As another process for producing the polycarbonate resin (B) of in the present invention, an interfacial polymerization process comprising reacting a dihydroxy compound and phosgene in the presence of solvents, an end terminating agent and an acid binder is applied. Usually, a dihydroxy compound and an end terminating agent are dissolved in an aqueous solution of acid binder and then the reaction is performed in the presence of an organic solvent.

Preferable examples of the acid binder include pyridine, hydroxides of alkaline metal such as sodium hydroxide and potassium hydroxide. Preferable examples of the solvent include methylene chloride, chloroform, chlorobenzene and bromonaphthalene. As a catalyst to promote the polymerization reaction, tertiary amines such as triethylamine or quaternary ammonium salts such as tetra-n-butylammonium bromide are used.

Examples of the end terminating agent to be used for adjustment of polymerization degree include monofunctional hydroxy compounds such as phenol, p-tert-butyl phenol, p-cumyl phenol and long chain alkyl-substituted phenol. Further, if necessary, a small amount of antioxidants such as sodium sulfite and sodium hydrosulfite may be added.

The reaction is performed usually in the range of 0 to 150° C. and preferably in the range of 5 to 40° C. The reaction time depends on the reaction temperature and is usually 0.5 minutes to 10 hours and preferably 1 minute to 2 hours. It is preferable to maintain pH of the reaction system to at least 10 during the reaction.

As the process for producing the blend resin composition of the present invention, the following processes may be applied. That is, the blend resin composition may be produced by blending each solids of polycarbonate resins (A) and (B) produced each separately and kneading with a kneading machine or may be produced by adding the solid resin (B) to the resin (A) in a molten state or adding the solid resin (A) to the resin (B) in a molten state and kneading with a kneading machine. Further, it may be produced also by blending the resins (A) and (B) in a molten state and kneading with a kneading machine. The kneading may be performed in a continuous process or in a batch wise. As the kneading machine, an extruder, a labopastomill and a kneader may be applied. When kneading is performed in a continuous process, an extruder is suitably applied. When kneading is performed in a batch wise, a labopastomill or a kneader is suitably applied.

When a polycarbonate resin produced by a melt polycondensation process is used, it is preferable to perform kneading after deactivation of a catalyst from the aspect to avoid transesterfication reaction during kneading. A catalyst deactivator may be kneaded together with the resins to be blend or may be kneaded after blending. In such case, the range in which chemical resistance and oil resistance of the blend resin composition are not impaired by random change due to transesterification reaction between resins (A) and (B) should be maintained.

As another process for producing the blend resin composition of the present invention, also a process comprising dissolving the polycarbonate resins (A) and (B) in a solvent and pouring it into a mold and then vaporizing the solvent may be applied. As the solvent, methylene chloride, chloroform, chlorobenzene, cresol, dichloroethane and trichloroethane are used.

When this process is applied, it is convenient since additives can be dissolved and added at the same time.

If necessary, antioxidant, a releasing agent, an ultraviolet absorber, a flowability improving agent, a reinforcing agent, crystalline nucleus agent, dye, an antistatic agent, and an antibacterial agent may be added to the blend resin composition of the present invention. These additives may be added to each the resins (A) and (B) or either one thereof prior to blending and kneading or may be added and kneaded at the same time during blending and kneading or may be kneaded after blending.

"Chemical resistance" to be exhibited in the present invention indicates to what degree the blend resin composition is eroded with organic solvents such as hydrocarbon solvents, a ketone type solvent, an ester type solvent and alcohols. In more detail, it is represented by change of appearance, change of form or change of mass.

"Oil resistance" to be exhibited in the present invention indicates to what degree degradation of physical properties of the polycarbonate resin composition caused by contacting oils such as spindle oil, dynamo oil, turbine oil, machine oil, heavy oil, engine oil, salad oil, soybean oil, castor oil and sebum is lower depressed. In more detail, oils are coated on a test piece and then bending stress is imposed on the coated test piece to deflect it to a prescribed quantity and a situation of crack occurrence is observed.

It is preferable that both chemical resistance and oil resistance are represented by −30° C. to 90° C.

The transparent protective sheet to be used on the polarizing sheet of the present invention can be produced by molding the polycarbonate resin composition according to a cast method, a melt press method or an extruded film formation method. The thickness of the transparent protective sheet is preferably 0.05 to 5 mm and more preferably 0.1 to 1 mm. When the thickness of the transparent protective sheet is thinner than 0.05 mm, it is not preferable since strength of the polarizing sheet becomes insufficient and breakage of a molded article readily occurs in the processing. When the thickness is larger than 5 mm, it is not preferable since handling during processing becomes bad.

The polarizing film to be used in the present invention is not limited so long as it is a thin film having a polarizing function. A heat resisting film is preferable, considering post processing in case that the polarizing film subjected to curve processing is used for anti-glare. For example, a stretch-oriented polyvinylalcohol film adsorbed iodine or a dichroic dye is suitably used.

As a process for producing the polarizing film, for example, a polymer film is immersed in an aqueous solution of 10 to 50° C. dissolved iodine or a dichroic dye to adsorb iodine or the dichroic dye and then immersed in an aqueous solution of 10 to 80° C. dissolved additives such as metal ions and boric acid and stretched by 2.5 to 8 times toward one direction in such immersed state, whereby the polarizing film can be produced.

The thickness of the polarizing film is not limited. A polarizing film with thickness 0.02 to 0.12 mm is suitably used from the aspect of handling.

The polarizing sheet of the present invention is produced by adhering a transparent protective sheet to one side or both sides of the above-mentioned polarizing film. A method for adhering it to both sides thereof is suitably applied. For its adhesion, it is preferable to use an adhesive with high transparency, not readily colored with lapse of time and excellent in heat resistance. In more detail, acrylic type, epoxy type or urethane type adhesive is suitably used.

The polarizing sheet surface of the present invention is subjected to a hard coating treatment, an anti-foggy treatment, a coloration treatment, an infrared reflection treatment, an infrared absorption treatment, an ultraviolet reflection treatment or an ultraviolet absorption treatment, depending on its use.

The polarizing sheet exhibits its advantageous effects not only in a flat sheet shape, but also in a curve surface-processed shape. In other words, even when it is curve surface-processed, optical strain is substantially scarcely caused. Thus, it is suitable to uses for anti-glare in sunglasses and goggles to be curve-surface processed. Since a sunglass or a goggle obtained by curve surface-processing the polarizing sheet of the present invention has a very small optical strain, no rainbow pattern is observed on its surface and its appearance is excellent, and furthermore eyesight is not readily impaired during putting-on, so that it becomes possible to apply it continuously for a long time.

The method for curve surface-processing of the polarizing sheet is not limited. One method selected from known processing methods including vacuum forming, pressure forming and press forming is applied.

PREFERRED EMBODIMENT OF THE INVENTION

The present invention will be described in more detail below, referring to Examples, which are not intended to limit the scope of the present invention.

The properties of the polycarbonate resins were measured according to the following methods or apparatuses.

[Polystyrene-Converted Weight Average Molecular Weight (Mw)]

The measurement was performed by GPC (Gel Permeation Chromatography) using chloroform as a developing solvent. The calibration curve for polystyrene conversion was made using standard polystyrene having a known molecular weight (molecular weight distribution=1). Mw was calculated from retention times of GPC based on the calibration curve.

[Glass Transition Temperature (Tg)]

The measurement was performed by a Differential Scanning Calorimeter (DSC).

[Press Forming]

A pattern sheet and a resin were interposed between two mirror sheets preheated to $(Tg+48)°$ C. and set to a heating presser heated to $(Tg+48)°$ C. and heat pressed under a pressure of 100 $kgf/cm^2$ for 2.5 minutes. Then, the test piece subjected to heat pressing was put between cooling plates of 20° C. and cooled for 5 minutes under an applied pressure of 100 $kgf/cm^2$, whereby a pressed sheet was obtained.

[Form Change of Test Piece]

The measurement was performed with a slide calipers. When it is impossible to measure with a slide calipers, the evaluation was visually performed.

[Appearance Change of Test Piece]

The evaluation was visually performed.

[Deflection]

A load was imposed on a test piece with Autograph AG-5000B, manufactured by Shimazu Seisakusho k.k., in Japan, whereby deflection was allowed to generate on the test piece.

[Bending Test Piece]

Bending test piece was prepared by injection molding with MIN7, manufactured by Niigata Tekko k.k., Japan. The size of the bending test piece is length 89 mm, width 12.65 mm and height 3.23 mm.

[Flexural Elastic Modulus]

The measurement was performed by Autograph AG-5000 B, manufactured by Shimazu Seisakusho k.k., Japan.

[Photoelastic Constant]

A cast film with thickness 100 µm was prepared using methylene chloride as a solvent. The measurement was performed by Elliposometer, DVA-36L, manufactured by Mizojiri Optical Co., Ltd, Japan with a light source of wave length 633 nm.

[Total Light Transmittance]

The measurement was performed with COLOR AND COLOR DIFFERENCE MODEL 1001DP according to JIS K7105.

EXAMPLE 1

10.11 kg (23.05 mol) of 9,9-bis(4-(2-hydroxy-ethoxy)phenyl)fluorene, 4.524 kg (23.05 mol) of tricyclo[$5.2.1.0^{2,6}$]decanedimethanol, 10.22 kg (47.71 mol) of diphenyl carbonate and 0.01321 g ($1.572 \times 10^{-4}$ mol) of sodium hydrogencarbonate were charged to a reactor of 50 L, equipped with a stirrer and a distiller and heated to 215° C. with stirring in a nitrogen atmosphere under 760 Torr over one hour.

Then, reactor's interior reduced pressure degree was adjusted to 150 Torr over 15 minutes and the conditions of 215° C. and 150 Torr were maintained for 20 minutes to perform the transesterfication reaction. It's interior temperature was further raised up to 240° C. at the rate of 37.5° C./hr and the conditions of 240° C. and 150 Torr were maintained for 10 minutes. Then, its interior reduced pressure degree was adjusted to 120 Torr over 10 minutes and the conditions of 240° C. and 120 Torr were maintained for 70 minutes. Then, its interior reduced pressure degree was adjusted to 100 Torr over 10 minutes and the conditions of 240° C. and 100 Torr were maintained for 10 minutes. Its interior reduced pressure degree was further adjusted to 1 Torr or below over 40 minutes and the polymerization reaction was performed with stirring for 25 minutes under the conditions of 240° C. and 1 Torr or below. After the completion of the reaction, nitrogen was injected into the reactor interior to apply a pressure and a polycarbonate resin thus produced was withdrawn while pelletizing it. The polycarbonate resin thus obtained had Mw=87,000 and Tg=130° C. 10.0 kg of the polycarbonate resin was vacuum dried at 100° C. for 24 hours and 10 times mol of diethyl phosphite to sodium hydrogencarbonate in the resin and 300 ppm of glycerine monostearate to the resin were added thereto and kneaded at 260° C. with an extruder and pelletized, whereby a pellet (A) was obtained. The pellet (A) had Mw=85,800.

4 kg of the pellet (A) was sufficiently mixed with 4 kg of pellet of polycarbonate resin IUPILON E-2000 (trade name) derived from bisphenol A, manufactured by Mitsubishi Engineering Plastics Co., Ltd, in Japan and kneaded at 260° C. with an extruder and pelletized, whereby 6.8 kg of a blend pellet was obtained, The blend pellet had Tg=139° C. and no other transition point was found. Thereby, it was confirmed that the blend was perfectly compatible with each other.

The blend pellet had Mw=73,300 and photoelastic constant=$50 \times 10^{-12}$ $m^2/N$.

The blend pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 1. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 1.

The blend pellet was injection molded at a cylinder temperature of 280° C. and at a mold temperature of 80° C., whereby a bending test piece was obtained. The flexural elastic modulus of the bending test piece was 2600 MPa. Further, the bending test piece was immersed in acetone or butyl acetate for 2 hours and then each flexural elastic modulus of the bending test piece was measured and in order, each was 2400 MPa and 2400 MPa. Thus, its decreased width was small.

EXAMPLE 2

The experiment was performed in the same manner as in Example 1 except that kneading was performed using 2 kg of polycarbonate resin pellet (A) and 6 kg of IUPILON E-2000 pellet. The blend pellet thus obtained had Tg=146° C., Mw=72,100 and photoelastic constant=$60 \times 10^{-12}$ $m^2/N$.

The blend pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 1. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 1.

The blend pellet was injection molded at a cylinder temperature of 285° C. and at a mold temperature of 85° C., whereby a bending test piece was obtained. The flexural elastic modulus of the bending test piece was 2400 MPa. Further, the bending test piece was immersed in acetone or butyl acetate for 2 hours and then each flexural elastic modulus of the bending test piece was measured and in order, each was 2300 MPa and 2300 MPa. Thus, its decreased width was small.

EXAMPLE 3

The experiment was performed in the same manner as in Example 1 except that kneading was performed using 6 kg of polycarbonate resin pellet (A) and 2 kg of IUPILON E-2000 pellet. The blend pellet thus obtained had Tg=133° C., Mw=76,300 and photoelastic constant=$33 \times 10^{-12}$ $m^2/N$.

The blend pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 1. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 1.

The blend pellet was injection molded at a cylinder temperature of 275° C. and at a mold temperature of 75° C., whereby a bending test piece was obtained. The flexural elastic modulus of the bending test piece was 2600 MPa. Further, the bending test piece was immersed in acetone or butyl acetate for 2 hours and then each flexural elastic modulus of the bending test piece was measured and in order, each was 2400 MPa and 2400 MPa. Thus, its decreased width was small.

EXAMPLE 4

The experiment was performed in the same manner as in Example 1 except that 3.324 kg (23.05 mol) of cyclohexane-1,4-dimethanol was used instead of tricyclo[$5.2.1.0^{2,6}$]decanedimethanol and reactor's interior reduced pressure degree was adjusted to 150 Torr over 45 minutes. The pellet thus obtained had Tg=120° C. and Mw=81,400. The same additives as in Example 1 were added to the pellet, whereby a pellet (A-2) was obtained. The pellet (A-2) thus obtained had Mw=81,200.

4 kg of the polycarbonate resin pellet (A-2) and 4 kg of IUPILON E-2000 were kneaded and the same procedure as in Example 1 was performed. The blend pellet thus obtained had Tg=133° C., Mw=70,000 and photoelastic constant=$52 \times 10^{-12}$ $m^2/N$.

The blend pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 1. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 1.

The blend pellet was injection molded at a cylinder temperature of 275° C. and at a mold temperature of 75° C., whereby a bending test piece was obtained. The flexural elastic modulus of the bending test piece was 2500 MPa. Further, the bending test piece was immersed in acetone or butyl acetate for 2 hours and then each flexural elastic modulus of the bending test piece was measured and in order, each was 2400 MPa and 2400 MPa. Thus, its decreased width was small.

EXAMPLE 5

The experiment was performed in the same manner as in Example 1 except that 6.048 kg (23.05 mol) of pentacyclopentadecanedimethanol was used instead of tricyclo[$5.2.1.0^{2,6}$]decanedimethanol. The pellet thus obtained had Tg=147° C. and Mw=86,500. The same additives as in Example 1 were added to the pellet, whereby a pellet was obtained. The pellet thus obtained had Mw=85,900.

4 kg of the polycarbonate resin pellet and 4 kg of IUPILON E-2000 were kneaded and the same procedure as in Example 1 was performed. The blend pellet thus obtained had Tg=149° C., Mw=74,700 and photoelastic constant=$43 \times 10^{-12}$ $m^2/N$.

The blend pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 1. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 1.

The blend pellet was injection molded at a cylinder temperature of 285° C. and at a mold temperature of 85° C., whereby a bending test piece was obtained. The flexural elastic modulus of the bending test piece was 2500 MPa. Further, the bending test piece was immersed in acetone or butyl acetate for 2 hours and then each flexural elastic modulus of the bending test piece was measured and in order, each was 2300 MPa and 2400 MPa. Thus, its decreased width was small.

COMPARATIVE EXAMPLE 1

4.298 kg (9.802 mol) of 9,9-bis(4-(2-hydroxy-ethoxy)phenyl)fluorene, 1.924 kg (9.802 mol) of tricyclo[$5.2.1.0^{2,6}$]decanedimethanol, 6.050 kg (26.50 mol) of 2,2-bis(4-hydroxyphenyl)propane, 10.37 kg (48.41 mol) of diphenyl carbonate and 0.01321 g ($1.572 \times 10^{-4}$ mol) of sodium hydrogencarbonate were charged to a reactor of 50 L, equipped with a stirrer and a distiller and heated to 215° C. with stirring in a nitrogen atmosphere under 760 Torr over one hour.

Then, reactor's interior reduced pressure degree was adjusted to 150 Torr over 15 minutes and the conditions of 215° C. and 150 Torr were maintained for 30 minutes to perform the transesterfication reaction. It's interior temperature was further raised up to 245° C. at the rate of 37.5° C./hr and the conditions of 245° C. and 150 Torr were maintained for 30 minutes. Then, its interior reduced pressure degree was adjusted to 120 Torr over 10 minutes and the conditions of 245° C. and 120 Torr were maintained for 90 minutes. Then, its interior reduced pressure degree was adjusted to 100 Torr over 10 minutes and the conditions of 245° C. and 100 Torr were maintained for 30 minutes. Its interior reduced pressure degree was further adjusted to 1 Torr or below over 40 minutes and the polymerization reaction was performed with stirring for 80 minutes under the conditions of 245° C. and 1 Torr or below. After the completion of the reaction, nitrogen was injected into the reactor interior to apply a pressure and a polycarbonate resin thus produced was withdrawn while pelletizing it. The polycarbonate resin thus obtained had Mw=74,100 and Tg=139° C. 10.0 kg of the polycarbonate resin was vacuum dried at 100° C. for 24 hours and 10 times mol of diethyl phosphite to sodium hydrogencarbonate in the resin and 300 ppm of glycerine monostearate to the resin were added thereto and kneaded at 260° C. with an extruder and pelletized, whereby a pellet was obtained. The pellet had Mw=73,700 and photoelastic constant=$55 \times 10^{-12}$ m$^2$/N.

The pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 2. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 2.

The pellet was injection molded at a cylinder temperature of 280° C. and at a mold temperature of 80° C., whereby a bending test piece was obtained. The flexural elastic modulus of the bending test piece was 2500 MPa. Further, the bending test piece was immersed in acetone or butyl acetate for 2 hours and then each flexural elastic modulus of the bending test piece was measured and in order, each was 2100 MPa and 2100 MPa. Thus, its decreased width was large.

COMPARATIVE EXAMPLE 2

The experiment was performed in the same manner as in Comparative Example 1 except that 1.998 kg (4.555 mol) of 9,9-bis(4-(2-hydroxyethoxy)phenyl)fluorene, 0.8941 kg (4.555 mol) of tricyclo[$5.2.1.0^{2,6}$]decanedimethanol, 8.444 kg (36.99 mol) of 2,2-bis(4-hydroxyphenyl)propane and 10.47 kg (48.87 mol) of diphenyl carbonate were used and polymerization reaction was performed with stirring under the conditions of 245° C. and 1 Torr or below for 100 minutes. The resin thus obtained had Tg=146° C. and Mw=73,000. The pellet after extrusion to add additives had Mw=72,200 and photoelastic constant=$67 \times 10^{-12}$ m$^2$/N.

The pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 2. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 2.

The pellet was injection molded at a cylinder temperature of 285° C. and at a mold temperature of 85° C., whereby a bending test piece was obtained. The flexural elastic modulus of the bending test piece was 2400 MPa. Further, the bending test piece was immersed in acetone or butyl acetate for 2 hours and then each flexural elastic modulus of the bending test piece was measured and in order, each was 2000 MPa and 1900 MPa. Thus, its decreased width was large.

COMPARATIVE EXAMPLE 3

The experiment was performed in the same manner as in Comparative Example 1 except that 6.973 kg (15.90 mol) of 9,9-bis(4-(2-hydroxyethoxy)phenyl)fluorene, 3.121 kg (15.90 mol) of tricyclo[$5.2.1.0^{2,6}$]decanedimethanol, 3.267 kg (14.31 mol) of 2,2-bis(4-hydroxyphenyl)propane and 10.27 kg (47.94 mol) of diphenyl carbonate were used and polymerization reaction was performed with stirring under the conditions of 245° C. and 1 Torr or below for 60 minutes. The resin thus obtained had Tg=131° C. and Mw=75,900. The pellet after extrusiont to add additives had Mw=74,900 and photoelastic constant=$42 \times 10^{-12}$ m$^2$/N.

The pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 2. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 2.

The pellet was injection molded at a cylinder temperature of 275° C. and at a mold temperature of 75° C., whereby a bending test piece was obtained. The flexural elastic modulus of the bending test piece was 2600 MPa. Further, the bending test piece was immersed in acetone or butyl acetate for 2 hours and then each flexural elastic modulus of the bending test piece was measured and in order, each was 2000 MPa and 2000 MPa. Thus, its decreased width was large.

COMPARATIVE EXAMPLE 4

The experiment was performed in the same manner as in Comparative Example 1 except that 4.495 kg (10.25 mol) of 9,9-bis(4-(2-hydroxyethoxy)phenyl)fluorene, 1.478 kg (10.25 mol) of cyclohexane-1,4-dimethanol and 5.842 kg (25.59 mol) of 2,2-bis(4-hydroxyphenyl)propane were used and reactor's interior reduced pressure degree was adjusted to 150 Torr over 45 minutes. The resin thus obtained had Tg=131° C. and Mw=72,000. The pellet after extrusion to add additives had Mw=71,600 and photoelastic constant=$59 \times 10^{-12}$ $m^2/N$.

The pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 2. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 2.

The pellet was injection molded at a cylinder temperature of 275° C. and at a mold temperature of 75° C., whereby a bending test piece was obtained. The flexural elastic modulus of the bending test piece was 2500 MPa. Further, the bending test piece was immersed in acetone or butyl acetate for 2 hours and then each flexural elastic modulus of the bending test piece was measured and in order, each was 1900 MPa and 2000 MPa. Thus, its decreased width was large.

COMPARATIVE EXAMPLE 5

The experiment was performed in the same manner as in Comparative Example 1 except that 4.075 kg (9.293 mol) of 9,9-bis(4-(2-hydroxyethoxy)phenyl)fluorene, 2.438 kg (9.293 mol) of pentacyclopentadecanedimethanol and 6.280 kg (27.51 mol) of 2,2-bis(4-hydroxyphenyl)propane were used and polymerization reaction was performed with stirring under the conditions of 245° C. and 1 Torr or below for 100 minutes. The resin thus obtained had Tg=148° C. and Mw=75,500. The pellet after extrusion to add additives had Mw=75,000 and photoelastic constant=$50 \times 10^{-12}$ $m^2/N$.

The pellet was press formed, whereby a disc of diameter 50 mm and thickness 3 mm was obtained. The disc was immersed in each toluene, acetone and butyl acetate of 23° C. for 2 hours and form change and appearance change of the disc were observed. The data of chemical resistance are shown in Table 2. Salad oil was coated on both sides of the disc and then a linear load was imposed from an upper surface of the disc along its diameter direction at 23° C. and 50° C. to cause a prescribed deflection (three point support, support width: 24 mm, deflection quantity: 0.8 mm) and the situation of crack occurrence after 2 minutes was visually observed. The test results of oil resistance were shown in Table 2.

The pellet was injection molded at a cylinder temperature of 285° C. and at a mold temperature of 85° C., whereby a bending test piece was obtained. The flexural elastic modulus of the bending test piece was 2500 MPa. Further, the bending test piece was immersed in acetone or butyl acetate for 2 hours and then each flexural elastic modulus of the bending test piece was measured and in order, each was 2000 MPa and 2100 MPa. Thus, its decreased width was large.

EXAMPLE 6

16 g of the polycarbonate resin pellet (A) synthesized in Example 1 and 49 g of the polycarbonate resin E-2000 derived from bisphenol A, manufactured by Mitsubishi Engineering Plastics Co., Ltd, in Japan were kneaded with a laboplastomill set to 260° C. for 6 minutes while injecting nitrogen. It was confirmed that the recovered resin composition was transparent and had Tg=146° C. and another transition point was not observed and the resin composition was compatible with each other. The resin composition was pressure-pressed at 240° C. under a pressure of 10 MPa for one minute, whereby a transparent protective sheet of thickness 0.3 mm was obtained.

A urethane adhesive was coated on both sides of the polarizing film prepared according to Example 1 of Japanese Patent Kokai (laid-open) No. 63-311203 and the pressed sheet was adhered thereon, whereby a polarizing sheet of thickness 0.65 mm was obtained. A disc of diameter 80 mm was out from the polarizing sheet. The disc was vacuum formed with a spherical jig of curvature radius 80 mm at 140° C. under 500 Pa for 5 minutes, whereby a round shape curved surface polarizing sheet was obtained.

When the curved surface polarizing sheet was seen from its oblique side, color ununiformity of rainbow color was not observed. Further, when the curved surface polarizing sheet was observed in the state overlapped to a flat polarizing sheet disposed so as for each polarizing axes to form orthogonal position to each other, so-called "discoloration" in which a light is transmitted and colored interference fringe were not observed. Total light transmittance in this state was 0.4%. Even when the curved surface polarizing sheet was observed in state overlapped to a flat polarizing sheet manufactured by Fuji Kasei Co., Ltd, in Japan disposed so as for each polarizing axes to become parallel, coloration different from a color of the polarizing film was not observed in a portion of the polarizing sheet and colored interference fringe also was not observed. Thus, it was confirmed that optical strain of the curved surface polarizing sheet was very small.

EXAMPLE 7

A curved surface polarizing sheet of curvature radius 80 mm was obtained in the same manner as in Example 6 except that 52 g of the polycarbonate resin pellet (A) synthesized in Example 1 and 13 g of the polycarbonate resin E-2000 derived from bisphenol A were used and the vacuum forming temperature was 128° C.

When the curved surface polarizing sheet was seen from its oblique side, color ununiformity of rainbow color was not observed. Further, when the curved surface polarizing sheet was observed in the state overlapped to a flat polarizing sheet disposed so as for each polarizing axes to form orthogonal position to each other, so-called "discoloration" in which a light is transmitted and colored interference fringe were not observed. Total light transmittance in this state was 0.2%. Even when the curved surface polarizing sheet was observed in state overlapped to a flat polarizing sheet manufactured by Fuji Kasei Co., Ltd, in Japan disposed so as for each polarizing axes to become parallel, coloration different from a color of the polarizing film was not observed in a portion of the polarizing sheet and colored interference fringe also was not observed. Thus, it was confirmed that optical strain of the curved surface polarizing sheet was very small.

EXAMPLE 8

A curved surface polarizing sheet of curvature radius 80 mm was obtained in the same manner as in Example 6 except that 15 g of the polycarbonate resin pellet (A) synthesized in Example 1 and 45 g of the polycarbonate resin E-2000 derived from bisphenol A were dissolved in 240 g of dichloromethane and a transparent protective sheet of thickness 0.15 mm was obtained according to a cast method.

When the curved surface polarizing sheet was seen from its oblique side, color ununiformity of rainbow color was not observed. Further, when the curved surface polarizing sheet was observed in the state overlapped to a flat polarizing sheet disposed so as for each polarizing axes to form orthogonal position to each other, so-called "discoloration" in which a light is transmitted and colored interference fringe were not observed. Total light transmittance in this state was 0.3%. Even when the curved surface polarizing sheet was observed in state overlapped to a flat polarizing sheet manufactured by Fuji Kasei Co., Ltd, in Japan disposed so as for each polarizing axes to become parallel, coloration different from a color of the polarizing film was not observed in a portion of the polarizing sheet and colored interference fringe also was not observed. Thus, it was confirmed that optical strain of the curved surface polarizing sheet was very small.

EXAMPLE 9

A curved surface polarizing sheet of curvature radius 80 mm was obtained in the same manner as in Example 6 except that 32 g of the polycarbonate resin pellet (A-2) synthesized in Example 4 and 32 g of the polycarbonate resin E-2000 derived from bisphenol A were used and the vacuum forming temperature was 128° C.

When the curved surface polarizing sheet was seen from its oblique side, color ununiformity of rainbow color was not observed. Further, when the curved surface polarizing sheet was observed in the state overlapped to a flat polarizing sheet disposed so as for each polarizing axes to form orthogonal position to each other, so-called "discoloration" in which a light is transmitted and colored interference fringe were not observed. Total light transmittance in this state was 0.3%. Even when the curved surface polarizing sheet was observed in state overlapped to a flat polarizing sheet manufactured by Fuji Kasei Co., Ltd, in Japan disposed so as for each polarizing axes to become parallel, coloration different from a color of the polarizing film was not observed in a portion of the polarizing sheet and colored interference fringe also was not observed. Thus, it was confirmed that optical strain of the curved surface polarizing sheet was very small.

COMPARATIVE EXAMPLE 6

The experiment was performed in the same manner as in Example 6 except that a polycarbonate pressed sheet of thickness 0.3 mm derived from bisphenol A was used as a transparent protective sheet.

When the obtained curved surface polarizing sheet was seen from its oblique side, color ununiformity of rainbow color was observed. Further, when the curved surface polarizing sheet was observed in the state overlapped to a flat polarizing sheet disposed so as for each polarizing axes to form orthogonal position to each other, so-called "discoloration" in which a light is transmitted and colored interference fringe were observed. Total light transmittance in this state was 5.6%. Further, when the curved surface polarizing sheet was observed in state overlapped to a flat polarizing sheet manufactured by Fuji Kasei Co., Ltd, in Japan disposed so as for each polarizing axes to become parallel, coloration different from a color of the polarizing film was observed in a portion of the polarizing sheet and colored interference fringe also was observed. Thus, it was confirmed that optical strain of the curved surface polarizing sheet was large and had not uniformly low birefringence and were optically poor.

COMPARATIVE EXAMPLE 7

The experiment was performed in the same manner as in Example 6 except that a polycarbonate sheet of thickness 0.15 mm derived from bisphenol A prepared according to a cast method was used as a transparent protective sheet.

When the obtained curved surface polarizing sheet was seen from its oblique side, color ununiformity of rainbow color was observed. Further, when the curved surface polarizing sheet was observed in the state overlapped to a flat polarizing sheet disposed so as for each polarizing axes to form orthogonal position to each other, so-called "discoloration" in which a light is transmitted and colored interference fringe were observed. Total light transmittance in this state was 4.1%. Further, when the curved surface polarizing sheet was observed in state overlapped to a flat polarizing sheet manufactured by Fuji Kasei Co., Ltd, in Japan disposed so as for each polarizing axes to become parallel, coloration different from a color of the polarizing film was observed in a portion of the polarizing sheet and colored interference fringe also was observed. Thus, it was confirmed that optical strain of the curved surface polarizing sheet was large and had not uniformly low birefringence and were optically poor.

According to the present invention, a polycarbonate resin composition excellent in chemical resistance and oil resistance, having low birefringence can be obtained. The polycarbonate resin composition can be applied to a transparent protective sheet of a polarizing sheet, various lenses, pick-up lenses, prisms, optical sheets including films for transparent protective layer of DVD, optical films and light guide sheets, and furthermore it is very useful since these optical materials can be used under the circumstances to contact often chemicals and to contact often oil matters such as sebum. Further, according to the present invention, an excellent polarizing sheet with optical properties in which thermal formation is good and optical strain is not substantially caused in curve surface-processing can be obtained. It is useful since optical materials with excellent optical properties such as polarizing sun glass and a goggle can be obtained by applying the polarizing sheet.

TABLE 1

| Chemicals | Change | Example 1 | Example 2 | Example 3 | Example 4 | Example 5 |
| --- | --- | --- | --- | --- | --- | --- |
| Toluene | Form change | No change | No change | No change | No change | No change |
|  | Appearance change | Whitening, Minute crack | Whitening | Whitening, Minute crack | Whitening, Minute crack | Whitening |
| Acetone | Form change | No change | No change | No change | No change | No change |
|  | Appearance change | Whitening | Whitening | Whitening | Whitening | Whitening |
| Butyl acetate | Form change | No change | No change | No change | No change | No change |
|  | Appearance change | Change to semi-transparency | Change to Semi-transparency | Change to semi-transparency | Change to semi-transparency | Change to semi-transparency |
| Salad oil (23° C.) | Appearance change | B | A | B | B | A |
| Salad oil (50° C.) | Appearance change | C | B | C | C | B |
| Before immersion in chemicals | Flexural elastic modulus | 2500 MPa | 2400 MPa | 2600 MPa | 2500 MPa | 2500 MPa |
| After immersion in acetone | Flexural elastic modulus | 2300 MPa | 2300 MPa | 2400 MPa | 2400 MPa | 2300 MPa |
| After immersion in butyl acetate | Flexural elastic modulus | 2400 MPa | 2300 MPa | 2400 MPa | 2400 MPa | 2400 MPa |

Note: The word "No change" means that it is judged that a form is not actually changed since it is deemed that the form of a pressed piece is maintained and dimensional change is 0.1% or below which is in the range of an error.

Evaluation of appearance used salad oil;

A: Occurrence of minute crack extending over a narrow range.

B: Occurrence of minute crack extending over a wide range.

C: Occurrence of minute crack and large crack extending over a wide range.

TABLE 2

| Chemicals | Change | Comp. Example 1 | Comp. Example 2 | Comp. Example 3 | Comp. Example 4 | Comp. Example 5 |
| --- | --- | --- | --- | --- | --- | --- |
| Toluene | Form change | Dissolution Change to thin thickness | Dissolution Change to thin thickness | Dissolution Change to thin thickness | Dissolution Change to thin thickness | Dissolution Change to thin thickness |
|  | Appearance change | Deformation | Deformation | Remarkable deformation | Deformation | Deformation |
| Acetone | Form change | Swelling Softening | Swelling Softening | Swelling Softening | Swelling Softening | Swelling Softening |
|  | Appearance change | Face sagging | Whitening Face sagging | Face sagging | Face sagging | Face sagging |
| Butyl acetate | Form change | Swelling Softening | Swelling Softening | Swelling Softening | Swelling Softening | Swelling Softening |
|  | Appearance change | Face sagging | Face sagging | Face sagging | Face sagging | Face sagging |
| Salad oil (23° C.) | Appearance change | B | B | C | C | B |
| Salad oil (50° C.) | Appearance change | Breakage | Breakage | Breakage | Breakage | Breakage |
| Before immersion in chemicals | Flexural elastic modulus | 2500 MPa | 2400 MPa | 2600 MPa | 2500 MPa | 2500 MPa |
| After immersion in acetone | Flexural elastic modulus | 2100 MPa | 2000 MPa | 2000 MPa | 1900 MPa | 2000 MPa |
| After immersion in butyl acetate | Flexural elastic modulus | 2100 MPa | 1900 MPa | 2000 MPa | 2000 MPa | 2100 MPa |

What is claimed is:

1. A polycarbonate resin composition comprising a mixture of a polycarbonate resin (A) and a polycarbonate resin (B) in a ratio of (100×(A)/((A)+(B)))=1 to 99% by weight, in which the polycarbonate resin (A) is obtained by forming a carbonate bond from 95 to 5 mol % of a dihydroxy compound represented by the general formula (1)

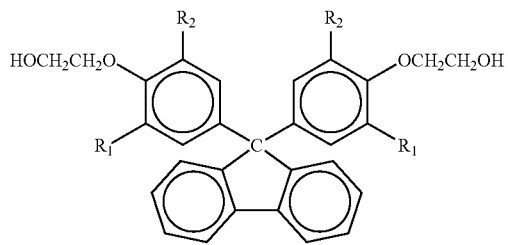

wherein $R_1$ and $R_2$ are, each independently, a hydrogen atom or a methyl group, 5 to 95 mol % of a dihydroxy compound represented by the general formula (2)

wherein Y is an alkylene group having 1 to 10 carbon atoms or a cycloalkylene group having 4 to 20 carbon atoms
and a carbonic acid diester;
and the polycarbonate resin (B) is obtained by forming a carbonate bond from a dihydroxy compound represented by the structural formula (3)

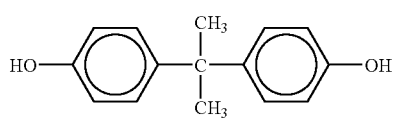

and a carbonic acid diester or phosgene.

2. The polycarbonate resin composition according to claim 1, wherein the dihydroxy compound represented by the general formula (2) is at least one compound selected from the group consisting of tricyclo[$5.2.1.0^{2,6}$]decanedimethanol, cyclohexane-1,4-dimethanol and pentacyclopentadecanedimethanol.

3. The polycarbonate resin composition according to claim 1, wherein the dihydroxy compound represented by the general formula (2) is tricyclo[$5.2.1.0^{2,6}$]decanedimethanol.

4. The polycarbonate resin composition according to claim 1, wherein $R_1$ in the general formula (1) is a hydrogen atom.

5. The polycarbonate resin composition according to claim 1, wherein each $R_1$ and $R_2$ in the general formula (1) are a hydrogen atom.

6. A polarizing sheet adhered a transparent sheet comprising the polycarbonate resin composition described in claim 1 to a polarizing film.

7. The polarizing sheet according to claim 6 wherein the dihydroxy compound represented by the general formula (2) is at least one compound selected from the group consisting of tricyclo[$5.2.1.0^{2,6}$]decanedimethanol, cyclohexane-1,4-dimethanol and pentacyclopentadecanedimethanol.

8. The polarizing sheet according to claim 6, wherein the dihydroxy compound represented by the general formula (2) is tricyclo[$5.2.1.0^{2,6}$]decanedimethanol.

9. The polarizing sheet according to claim 6, wherein $R_1$ in the general formula (1) is a hydrogen atom.

10. The polarizing sheet according to claim 6, wherein each $R_1$ and $R_2$ in the general formula (1) are a hydrogen atom.

11. A polarizing sheet for anti-glare obtained by curve surface-processing the polarizing sheet described in claim 6.

* * * * *